(12) United States Patent
Navali et al.

(10) Patent No.: US 8,862,124 B2
(45) Date of Patent: Oct. 14, 2014

(54) GATEWAY RELOCATION IN COMMUNICATION NETWORKS

(75) Inventors: Mruthyunjaya Navali, Westford, MA (US); Ravi Chamarty, Waltham, MA (US)

(73) Assignee: Cisco Technology, Inc., San Jose, CA (US)

( * ) Notice: Subject to any disclaimer, the term of this patent is extended or adjusted under 35 U.S.C. 154(b) by 814 days.

(21) Appl. No.: 12/688,567

(22) Filed: Jan. 15, 2010

(65) Prior Publication Data
US 2010/0232407 A1  Sep. 16, 2010

Related U.S. Application Data

(60) Provisional application No. 61/144,938, filed on Jan. 15, 2009.

(51) Int. Cl.
H04W 4/00 (2009.01)
H04W 36/00 (2009.01)
H04W 80/04 (2009.01)

(52) U.S. Cl.
CPC .......... *H04W 36/0033* (2013.01); *H04W 80/04* (2013.01)
USPC .................. 455/432.1; 455/435.1; 455/456.1; 455/432.2; 455/433; 455/552.1; 455/438; 370/338; 370/328; 370/230; 370/254; 370/351

(58) Field of Classification Search
USPC ......... 370/331, 338, 328, 230, 254, 335, 351; 455/436, 456, 432.2, 456.1, 432.1, 455/433, 438, 552.1, 411, 439, 437; 380/247
See application file for complete search history.

(56) References Cited

U.S. PATENT DOCUMENTS

| 7,840,217 | B2 * | 11/2010 | Patel et al. ..................... 455/439 |
| 2007/0189255 | A1 | 8/2007 | Navali et al. |
| 2007/0201697 | A1 * | 8/2007 | Altshuller et al. ............ 380/247 |
| 2008/0132237 | A1 * | 6/2008 | Yonenaga ..................... 455/436 |
| 2008/0273496 | A1 | 11/2008 | Wu |
| 2009/0122750 | A1 * | 5/2009 | Sarikaya ....................... 370/328 |

OTHER PUBLICATIONS

International Search Report and Written Opinion issued for PCT/US2010/021246, mailed Mar. 24, 2010 (10 pages).

* cited by examiner

*Primary Examiner* — Patrick Edouard
*Assistant Examiner* — Fred Casca
(74) *Attorney, Agent, or Firm* — Wilmer Cutler Pickering Hale and Dorr LLP (57) ABSTRACT

Systems and methods that provide a mechanism to relocate functions from one gateway to another gateway in a wireless communication network are disclosed. The gateway can implement an access service network (ASN) gateway in a WiMAX based network with a number of functionalities co-located on the gateway such as an authenticator, an anchor FA, an anchor DPF, a PMIP client, and a prepaid client. These functionalities can then be relocated from a first ASN gateway to a second ASN gateway. The proposed system and method reduces the messaging needed for the relocation and the number of components in the network, which can save capital and operating expenses. Additionally, the reduced messaging can reduce latency and delay in the process of relocating, which saves bandwidth and increases the level of service provided to the user.

14 Claims, 6 Drawing Sheets

FIG. 6

GATEWAY RELOCATION IN COMMUNICATION NETWORKS

CROSS-REFERENCE TO RELATED APPLICATIONS

This application claims benefit under 35 U.S.C. §119(e) of U.S. Provisional Patent Application No. 61/144,938, entitled "Gateway Relocation in a Communications Network," filed Jan. 15, 2009, and is hereby incorporated by reference herein in its entirety.

FIELD OF THE DISCLOSURE

This disclosure relates to a system and method for providing a mechanism to relocate functions from one gateway to another gateway in a wireless communication network.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed including WiFi, an implementation of various IEEE 802.11 protocols, WiMAX, an implementation of IEEE 802.16, and HiperMAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

SUMMARY OF THE DISCLOSURE

Systems and methods that provide a mechanism to relocate functions from one gateway to another gateway in a wireless communication network are disclosed. The gateway can implement an access service network (ASN) gateway with a number of functionalities implemented on the gateway or the ASN gateway. These functionalities can then be relocated from a first ASN gateway to a second ASN gateway. The relocation can be a relocation of services prompted by a handoff or a network initiated re-authorization. The systems and methods can reduce the messaging needed for the relocation and the number of components in the network. By combining multiple functionalities on to a gateway, the operator can save capital expenses (CAPEX) and operating expenses (OPEX). The reduced messaging can also reduce latency and delay in the process of relocating to save bandwidth and increase the level of service provided to the user.

In some embodiments, a method of relocating co-located mobility anchor and anchor authenticator functionalities to a first access service network gateway (ASNGW) that is performing as a serving gateway from a second ASNGW that is serving as an anchor gateway in a communication network that includes mobile subscribers is provided. The method includes receiving, at the first ASNGW, a relocation request from the second ASNGW including a dynamic host configuration protocol (DHCP) context and an authorization context associated with a mobile subscriber being relocated in an access service network (ASN), adding a dynamic host configuration protocol (DHCP) context to the first ASNGW to provide mobility anchor functionality for the mobile subscriber at the first ASNGW, sending, from the first ASNGW, a context report to update a WiMAX base station associated with the mobile subscriber that the first ASNGW is providing an anchor data path function (DPF) for the mobile subscriber, re-authenticating the mobile subscriber, at the first ASNGW, with the authorization context information received in the relocation request, and establishing the first ASNGW as an anchor authenticator associated with the mobile subscriber.

In certain embodiments, a method of relocating anchor functionality to a first gateway that is performing as a serving gateway from a second gateway that is serving as an anchor gateway in a communication network that includes mobile subscribers is provided. The method including receiving, at the first gateway, a relocation request from the second gateway including a mobility context and an authorization context associated with a mobile subscriber being relocated in an access service network (ASN), adding the mobility context information to the first gateway to provide mobility anchor functionality for the mobile subscriber at the first gateway, sending, from the first gateway, a context report to update a WiMAX base station associated with the mobile subscriber that the first gateway is providing the mobility anchor functionality, and re-authenticating the mobile subscriber, at the first gateway, with the authorization context information received in the relocation request.

In yet other embodiments, a gateway in an access service network (ASN) of a communication network that includes a WiMAX base station for communicating with a mobile subscriber is provided where the gateway includes co-located functionalities. The co-located functionalities including an authenticator functionality for authenticating the mobile subscriber and a mobility functionality for managing the mobility of the mobile subscriber in the communication network, wherein the gateway is configured to add the co-located functionalities after receiving a relocation message including a mobility context and an authorization context associated with the mobile subscriber being relocated in an access service network (ASN), and wherein the gateway is configured to update the WiMAX base station with new mobility information for the mobile subscriber and to re-authenticate the mobile subscriber at the gateway using the mobility context and the authorization context received in the relocation message.

DETAILED DESCRIPTION

Systems and methods that provide a mechanism to relocate functions from one gateway to another gateway in a wireless communication network are disclosed. A gateway may be used to implement the mobility management on packet flows for communications networks and support various functions that are co-located on the gateway. The functional components that can be implemented on the gateway include an authenticator, an anchor DPF (data path function), a foreign agent (FA), an accounting agent, a PMIP client, an accounting client, a dynamic host configuration protocol (DHCP) proxy, and a PPC (prepaid client). In some embodiments, an ASNGW (access service network (ASN) gateway (GW)) is described for use with a WiMAX (Worldwide Interoperability for Microwave Access) radio access network. The ASNGW can support multiple co-located functionalities and can support the relocation of these functionalities from a first ASNGW to a second ASNGW. The relocation can be triggered by a network initiated re-authentication trigger at the authenticator or completion of a handoff at an anchor DPF.

Figure 1:
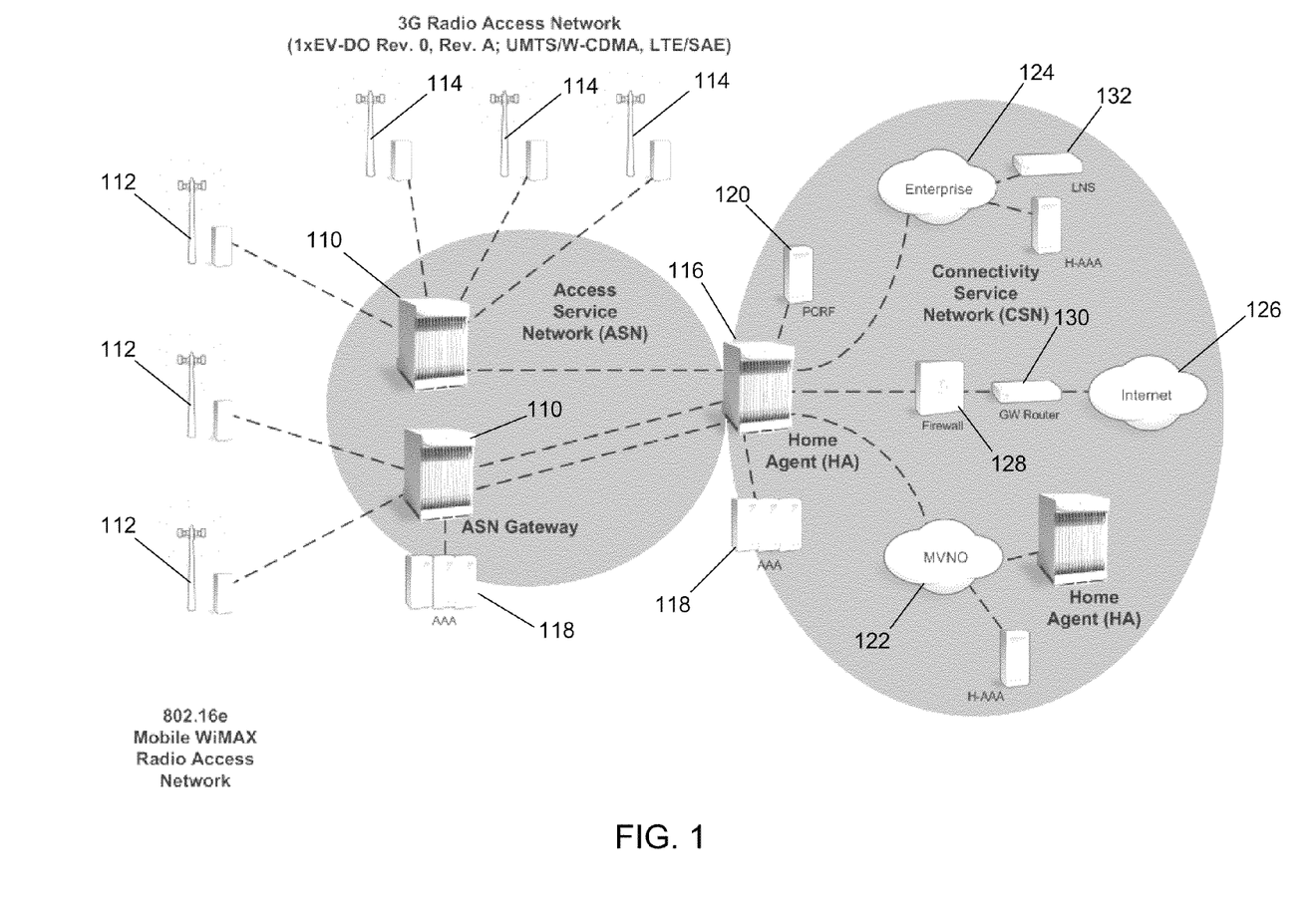
FIG. 1 illustrates a communications network with an ASN gateway in accordance with certain embodiments.

FIG. 1 illustrates an embodiment of communications network with an ASN gateway. The communications network includes access service network (ASN) gateways 110, WiMAX radio access network 112, 3G radio access network 114, home agent (HA) 116, authentication, authorization, and accounting (AAA) server 118, policy and charging rules function (PCRF) 120, mobile virtual network operator (MVNO) 122, an enterprise network 124, internet 126, firewall 128, router 130, and L2TP Network Server (LNS) 132. The ASN gateway (ASNGW) can be implemented with a gateway, which is further described below. The ASNGW 110 can communicate with WiMAX radio access networks 112 and 3G/Long Term Evolution (LTE) radio access networks 114 alone or in combination. The radio access networks 112 and 114 can communicate using the radio access spectrum with mobile subscribers, which can include mobile phones, wireless enabled computers, and any other suitable wireless device. The radio access network can communicate with an access service network, which includes ASNGW 110. The ASNGW 110 communicates with a home agent 116, which can be implemented in a gateway as described below.

The home agent 116 can provide mobility management to the mobile subscriber by tracking the location of the mobile subscriber and managing communications destined to or received by the mobile subscriber. The home agent can communicate with a number of networks such as internet 126, enterprise network 124, and mobile virtual network operator (MVNO) 122, for example. The MVNO 122 can be used to allow other operators to buy service from the operator and resell under their own brand with the other operator performing all marketing, billing, collections, and customer service for the customers they activate. The AAA server 118 can be used for verifying mobile subscribers seeking service on the network and providing an accounting for billing the mobile subscriber. The PCRF 120 can provide policies and rules to manage the activities of the mobile subscribers. Firewall 128 can provide protection to network elements by enforcing access and filter policies used to monitor and control traffic to and from a network. The firewall can be implemented as a set of rules and policies that determine which traffic should be permitted to go through or blocked to detect and prevent Denial of Service (DoS) attacks on the network.

The ASNGW 110 implemented on a gateway can provide a number of features. These include deep packet inspection (DPI) technology and service steering capabilities, multi-service integration of multiple access gateway functions on same hardware platform, and seamless transfer of stateful transaction information such as charging records, Quality of Service (QoS), and compression contexts on handoffs without the need for call re-registration. The gateway can also provide services in-line on the packet stream. The ASNGW 110 implements a number of co-located functionalities using a combination of software and hardware. The functionalities can be associated with a mobile subscriber or a session using information passed in a context or a context message. The context may include a number of TLV (type-length-value) elements to store information related to the mobile subscriber, a particular data connection, or a session for use in maintaining functionalities on the ASNGW 110. One type of context is a mobility context that can include information for anchoring mobility such as providing an anchor DPF, a DHCP client (with DHCP context information), a PMIP client, and a foreign agent (FA). The context can be used to setup the functionality on the ASNGW 110. In some embodiments, by adding the context to the ASNGW 110 the functionality can be initiated and being providing the services associated with the functionality.

An authenticator is an functionality residing on the ASNGW 110 at one end of a point-to-point link that facilitates authentication of a mobile subscriber attached to the other end of that link. The authenticator functionality enforces authentication before allowing access to services that are accessible to the mobile subscriber. The authenticator also incorporates AAA client functionality that enables the authenticator to communicate with the AAA backend infrastructure (AAA-based authentication server) to obtain authentication services over AAA protocols. The authenticator can be collocated with a security key distributor, the authentication relay, and the key receiver functions.

A WiMAX session can be established when the mobile subscriber performs a successful initial network entry and terminated when network exit procedures are performed. The WiMAX session can be identified by the AAA-Session-ID, which is assigned by the home AAA performing the authentication procedure as part of the initial network entry. The AAA-Session-ID is used in AAA transactions to identify the WiMAX session with a particular mobile subscriber. The WiMAX session can be maintained across anchor authenticator relocations and conveyed to HAs during MIP authentication procedures. The AAA-Session-ID is also inserted into the accounting stream and is used to correlate accounting records to that WiMAX session.

WiMAX defines a number of conceptual links, for example, R3, R4, and R6 to describe the various control and bearer plane protocol connections. These conceptual links can be implemented by one or more underlying physical links upon which the signaling occurs. R6 includes the set of control and bearer plane protocols for communication between the base station and the ASNGW. The R6 bearer plane includes an intra-ASN data path between the base station and ASN gateway. The R6 control plane includes protocols for data path establishment, modification, and release control in accordance with the mobile subscriber mobility events. R4 includes a set of control and bearer plane protocols originating/terminating in various functional entities of an ASN that coordinate MS mobility between ASNs and ASNGWs. R3 includes a set of control plane protocols between the ASN and the CSN to support AAA, policy enforcement, and mobility management capabilities. It also encompasses the Bearer Plane methods (e.g., tunneling) to transfer user data between the ASN and the CSN.

Figure 2:
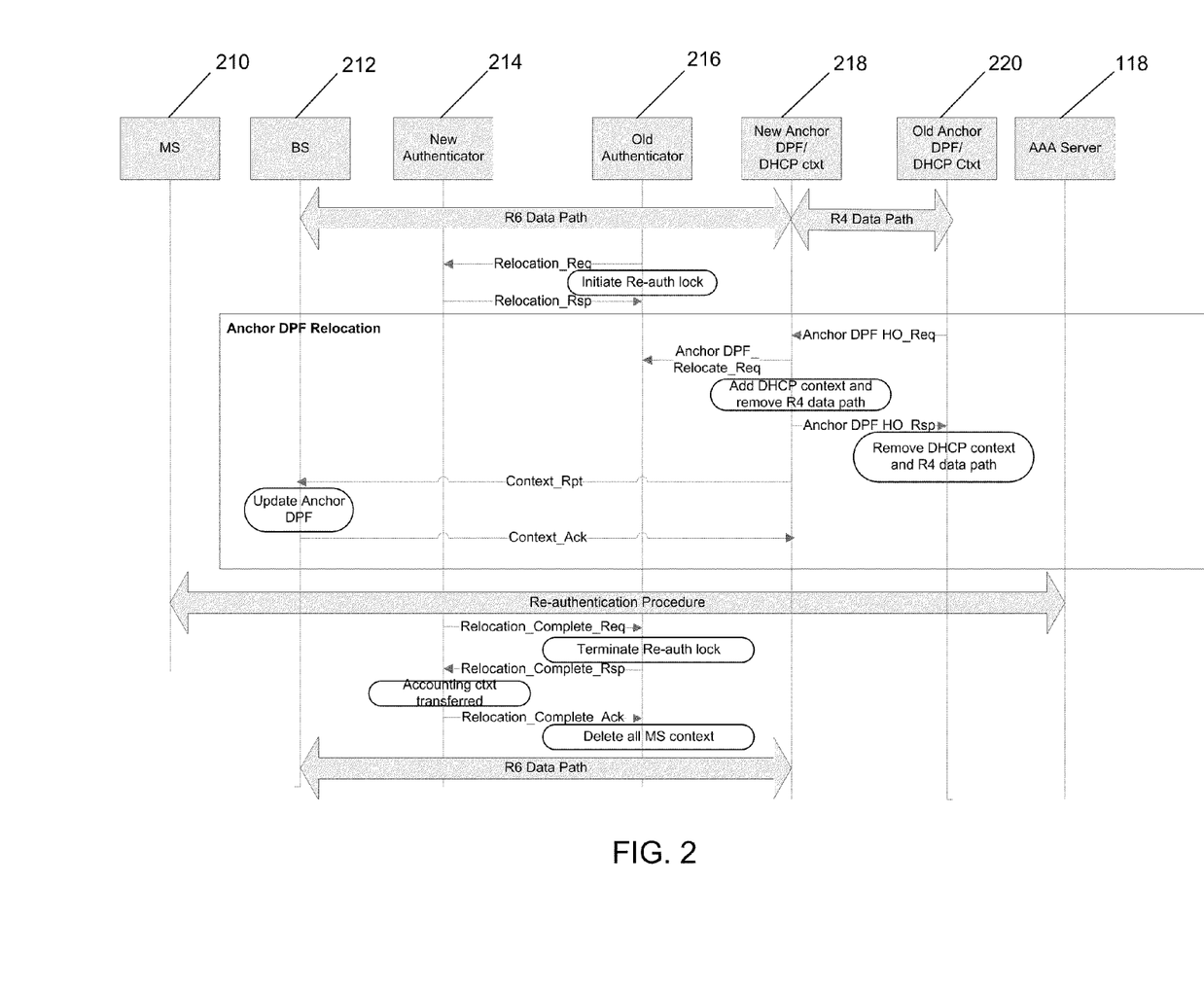
FIG. 2 illustrates a call flow of a relocation of an anchor ASNGW in a decomposed simple IP (SIP) architecture in accordance with certain embodiments.
Figure 3:
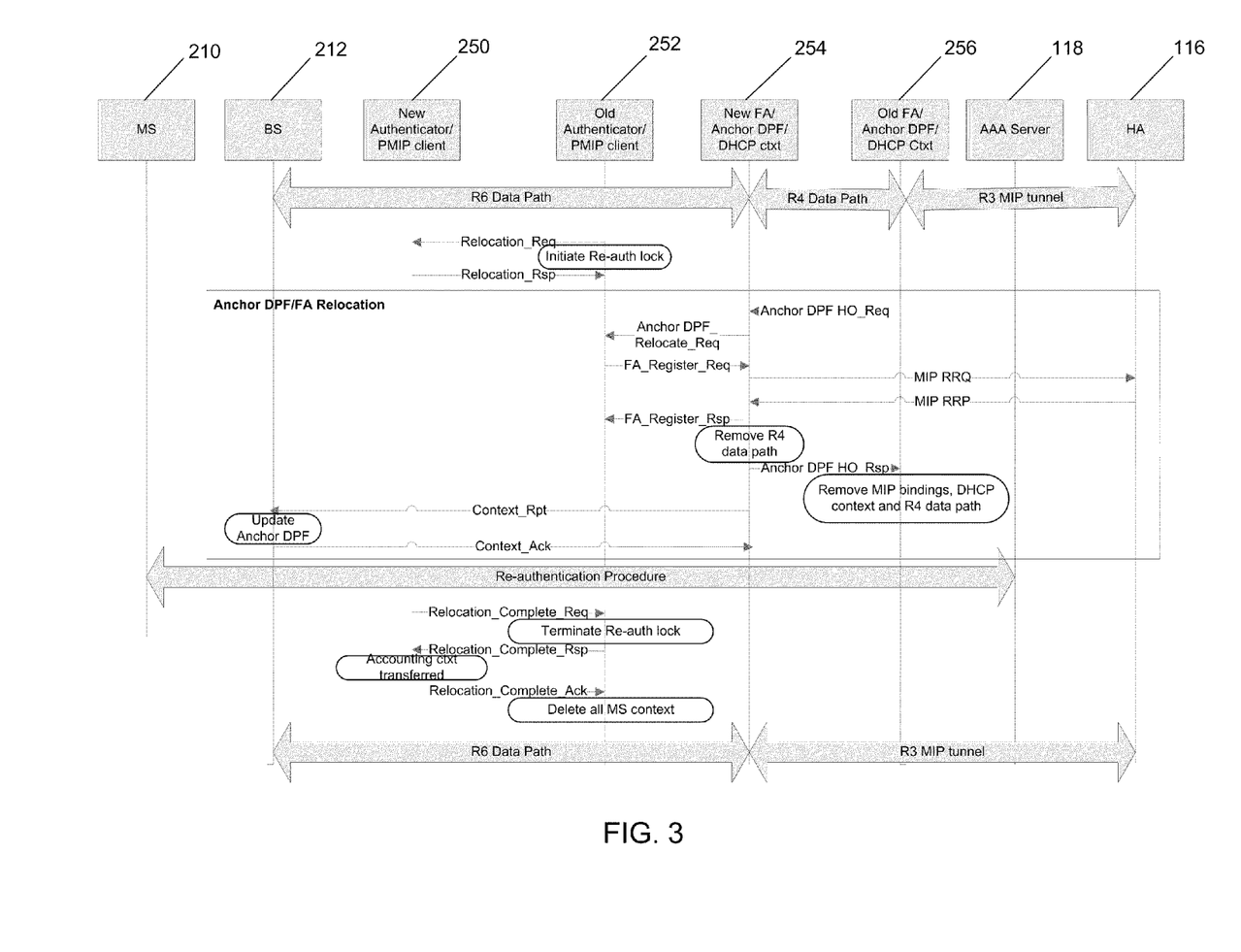
FIG. 3 illustrates a call flow of a relocation of an anchor ASNGW in a decomposed mobile IP (MIP) architecture in accordance with certain embodiments.

FIG. 2 illustrates a call flow of a relocation of an anchor ASNGW in a decomposed simple IP (SIP) architecture in accordance with some embodiments. The decomposed architecture includes a mobile subscriber 210, a base station 212, a new authenticator 214, an old authenticator 216, a new anchor DPF/DHCP context 216, an old anchor DPF/DHCP context 220, and AAA server 118. The call flow can be used for push mode relocation of SIP calls. In the call flow there is an authenticator relocation which includes the relocation of the authenticator, a proxy mobile IP (PMIP) client, an accounting client, and possibly a prepaid client (PPC). The foreign agent relocation includes the relocation of the foreign agent, the DHCP context, and the anchor DPF/accounting client. FIG. 3 illustrates a call flow of a relocation of an anchor ASNGW in a decomposed mobile IP (MIP) architecture in accordance with some embodiments. The decomposed architecture includes a mobile subscriber 210, a base station 212, a new authenticator/PMIP client 250, an old authenticator/PMIP client 252, a new FA/anchor DPF/DHCP context 254, an old FA/anchor DPF/DHCP context 256, an AAA server 118, and a HA 116.

Figure 4:
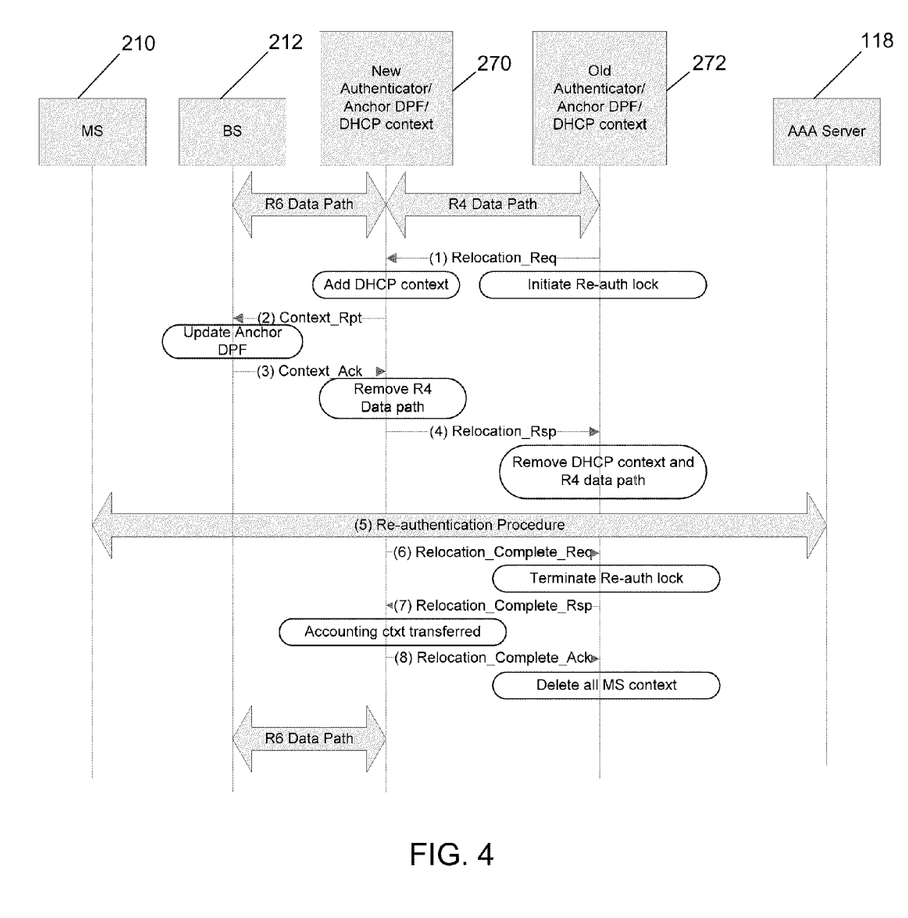
FIG. 4 illustrates ASNGW relocation for simple IP calls in accordance with certain embodiments.

FIG. 4 illustrates ASNGW relocation for simple IP calls in accordance with certain embodiments. The architecture of FIG. 4 includes a mobile subscriber 210, a base station 212, a new ASN gateway 270, an old ASN gateway 272, and AAA server 118. The ASN gateways 270 and 272 include co-located functions including an authenticator, an anchor DPF, and a DHCP context. This call flow provides for a push-mode relocation of an anchor ASNGW to serving ASNGW for Simple IP calls, which can provide benefits of reduced latency and signaling. In reference number 1 of FIG. 4, ASNGW 272 initiates relocation by starting a re-auth lock and sending a relocation message such as an R4 Relocation_Req message to the serving ASNGW 270. This message carries a DHCP context and a MS authorization context. These two contexts can include all the information needed to relocate the co-located functionalities on the ASNGW. The DHCP context can be considered a mobility context as it provides information to allow the relocation of the anchor DPF as well as other mobility functionalities. In addition, the relocation message updates the relevant serving base station (BS) information. In some embodiments, the relocation message can be sent without initiating a re-auth lock.

In reference 2, after receiving the relocation message, the serving ASNGW 270 adds the DHCP context and removes the R4 data path. ASNGW 270 can use the DHCP context to assume the role of anchor DPF and inform BS 212 about the change via a context reporting message such as the R6 Context_Rpt message. In reference 3, the BS 212 acknowledges the updated information with an acknowledgement message such as an R6 Context Ack message. In reference 4, the serving ASNGW 270 sends a R4 relocation response to ASNGW 272. Upon receipt of this message, ASNGW 272 removes the R4 data path and the DHCP context. The removal of the DHCP context includes the removal of the mobility functionalities such as the anchor DPF and the anchor FA. The ASNGW 272 can retain the anchor authenticator functionality. Since the accounting client (in authenticator) and agent (in anchor DPF) are now separated, interim accounting updates can be implemented until authenticator relocation is completed.

In reference 5, the new ASNGW 270 initiates the extensible authentication protocol (EAP) phase of re-authentication by sending an EAP-request/identity message via an R6 AR_EAP_Transfer message. This phase ends with the MSK established in the serving ASNGW 270 (now anchor authenticator) and the MS 210. The BS 212 is also updated with the new anchor authenticator. In reference 6, the completion of re-authentication is indicated to the old ASNGW 272 via a relocation complete message such as the R4 Relocation_Complete_Req message. In reference 7, upon receipt of the relocation complete req message at the old ASNGW, 272 the re-auth lock is terminated. The accounting context (such as accounting mode, etc.) is then transferred to the new ASNGW 270 via a relocation complete message such as the R4 Relocation_Complete_Rsp message. This process transfers the accounting client to the serving ASNGW 270. In reference 8, upon receipt of the R4 Relocation_Complete_Rsp message at the serving ASNGW 270, the transformation to anchor ASNGW is completed. The last state at old ASNGW 272 is removed by sending an R4 Relocation_Complete_Ack to the old ASNGW.

Figure 5:
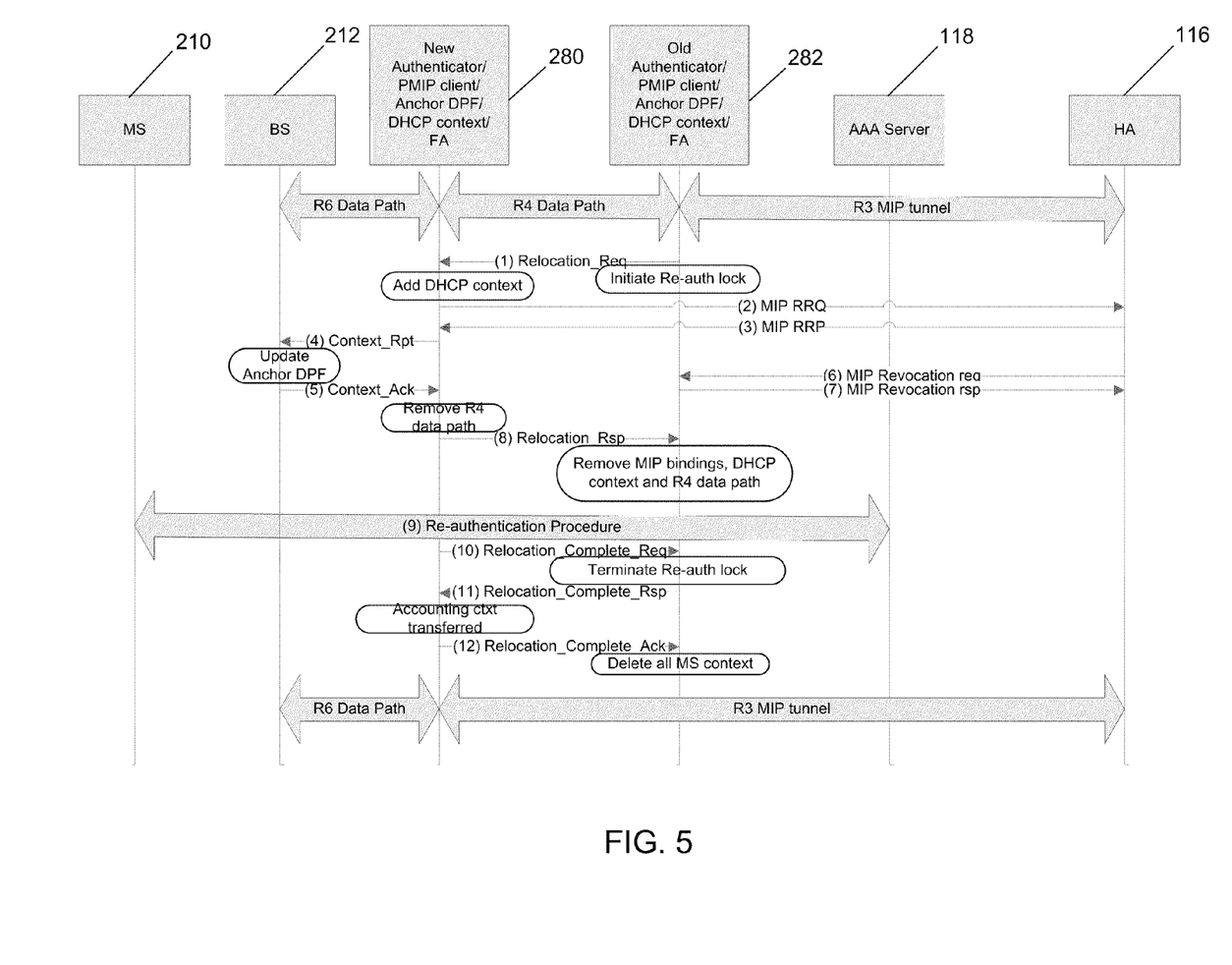
FIG. 5 illustrates an ASNGW relocation for mobile IP calls in accordance with certain embodiments.

FIG. 5 illustrates ASNGW relocation for mobile IP calls in accordance with certain embodiments. The architecture of FIG. 5 includes mobile subscriber 210, base station 212, new ASN gateway 280, old ASN gateway 282, and AAA server 118. The ASN gateways 280 and 282 include co-located functions including an authenticator, an anchor DPF, a foreign agent, a proxy mobile IP (PMIP) client, and a DHCP context. The call flow provides for relocation of Anchor ASNGW 282 to serving ASNGW 280 for mobile IP calls, which can provide benefits of reduced latency and signaling. The MIP tunnel is re-anchored at the new ASNGW 280 after the relocation process. In some embodiments, this call flow starts with the R4 data path between ASNGW 282 and ASNGW 280, and a MIP tunnel exists between FA (at ASNGW 282) and HA 116.

In reference number 1 of FIG. 5, ASNGW 282 initiates relocation by starting a re-auth lock and sending a relocation message such as an R4 Relocation_Req message to the serving ASNGW 280. This message carries the DHCP context and the MS authorization context. These two contexts can include all the information needed to relocate the co-located functionalities such as the mobility and authentication functionalities. The DHCP context can be considered a mobility context as it provides information to allow the relocation of the anchor DPF as well as other mobility functionalities. In addition, the relocation message updates the relevant serving BS information and can be padded with TLVs to carry the FA context. In reference 2, after receiving the Relocation_Req message, the serving ASNGW 280 creates the DHCP context and sends a mobile IP registration request (MIP RRQ) to home agent (HA) 116. In reference numbers 3, 6 and 7, after receiving MIP RRQ at the HA 116, a new FA address is updated and a mobile IP registration reply (MIP RRP) is sent to the serving ASNGW 280, which is providing the FA functionality. Later, a MIP revocation is issued to the old FA (co-located with the old ASNGW 282). In reference 4, after receiving the MIP RRP message, the serving ASNGW 280 assumes the role of anchor DPF and informs BS 212 about the change via the R6 Context_Rpt message. In assuming the role of anchor DPF and revoking the old FA, ASNGW 280 becomes the mobility anchor including the anchor DPF and FA functionalities. In reference 5, BS 212 acknowledges the updated information with an R6 Context_Ack message.

In reference 8, serving ASNGW 280 removes R4 data path and sends R4 relocation response to ASNGW 282. Upon receipt of this message, the ASNGW 282 removes the R4 data path and the DHCP context, and ASNGW 282 retains the anchor authenticator functionality. Since the accounting client (in authenticator) and agent (in anchor DPF) are now separated, interim accounting updates are implemented until authenticator relocation is completed. In reference 9, the new ASNGW 280 initiates EAP phase of re-authentication by sending EAP-request/identity message via R6 AR_EAP_Transfer message. This phase ends with the MSK established in the serving ASNGW 282 (now Anchor Authenticator) and the MS 210. The BS 212 is also updated with the new anchor authenticator. In reference 10, the completion of re-authentication is indicated to the old ASNGW 282 via the R4 Relocation Complete Req. In reference 11, upon receipt of the R4 Relocation_Complete_Req message at the old ASNGW 282, the re-auth lock is terminated. The accounting context (such as accounting mode, etc.) is then transferred to the new ASNGW 280 via the R4 Relocation_Complete_Rsp message. This process transfers the accounting client to the serving ASNGW 280. In reference 12, upon receipt of the R4 Relocation_Complete_Rsp message at the serving ASNGW 280, the transformation to anchor ASNGW can be completed. The last state at old ASNGW 282 is removed by sending an R4 Relocation_Complete_Ack to the old ASNGW 282.

Mobile Subscriber and Gateway

The mobile subscriber described above can communicate with a plurality of radio access networks using a plurality of access technologies and with wired communication networks. The mobile subscriber can be a smartphone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The mobile subscriber may have the capability to run applications or communicate with applications that are provided by servers in the communication network. The user equipment can receive updates and other information from these applications on the network.

The mobile subscriber also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The mobile subscriber can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The gateway described herein can implement multiple and different integrated functionalities. In some embodiments, one or more of an access service network gateway (ASNGW), mobility access gateway (MAG), an HRPD serving gateway (HSGW), a mobility management entity (MME), a packet data serving node (PDSN), a foreign agent (FA), a local mobility anchor (LMA), a PDN gateway (P-GW), a home agent (HA) can be implemented on a gateway. Other types of functionalities can also be implemented on a gateway in other embodiments are a Gateway General packet radio service Support Node (GGSN), a serving GPRS support node (SGSN), a packet data inter-working function (PDIF), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A gateway can include a PDSN, a FA, a HA, a GGSN, a PDIF, an ASNGW, a UPE, an IP Gateway, an access gateway, or any other applicable access interface device. In certain embodiments, a gateway is provided by Starent Networks, Corp. of Tewksbury, Mass. in a ST16 or a ST40 multimedia platform.

The gateway can also support sessions originated from a Femto base station, which would connect to the gateway through a broadband network. A person or corporation may use a Femto base station in a home or business to support one or more mobile subscribers. The gateway can provide trigger based traffic management during a handoff from a Femto base station to a WiMAX or other macro base station, while maintaining traffic management for the mobile node. In certain embodiments, a gateway device is provided by Starent Networks, Corp. of Tewksbury, Mass. on an ST16 or ST40 multimedia platform.

Figure 6:
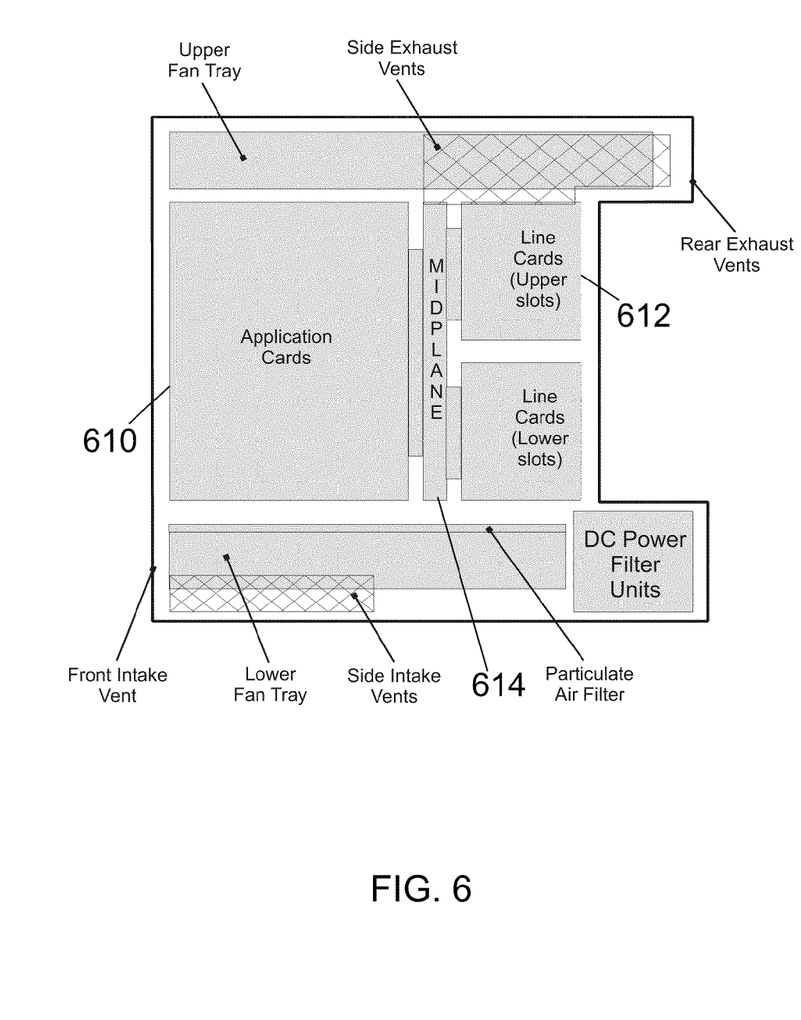
FIG. 6 illustrates a gateway in accordance with certain embodiments.

FIG. 6 illustrates a gateway in accordance with certain embodiments. The gateway can include slots for loading application cards 610 and line cards 612. A midplane 614 can be used in the gateway to provide intra-gateway communications, power connections, and transport paths between the various installed cards. The midplane 614 can include buses such as a switch fabric, a control bus, a system management bus, a redundancy bus, and a time division multiplex (TDM) bus. The switch fabric is an IP-based transport path for user data throughout the gateway implemented by establishing inter-card communications between application cards and line cards. The control bus interconnects the control and management processors within the gateway. The gateway management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The gateway supports at least two types of application cards: a switch processor card and a packet accelerator card. The switch processor card serves as a controller of the gateway and is responsible for such things as initializing the gateway and loading software configurations onto other cards in the gateway. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the gateway provide input/output connectivity and can also provide redundancy connections as well.

An ST40 embodiment of the gateway can support a system management card (SMC) and a packet services card (PSC), which are application cards 610. The system management card is a system control and management card for managing and controlling other cards in the gateway. The packet services card is a high-speed processing card that provides multi-threaded point-to-point, packet data processing, and context processing capabilities, among other things.

The operating system software can be based on a Linux software kernel and run specific applications in the gateway such as monitoring tasks and providing protocol stacks. The software allows gateway resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a MAG, LMA, HSGW, P-GW, MME, PDSN, ASNGW, PDIF, HA, GGSN, or IPSG).

The gateway's software can be divided into a series of tasks that perform specific functions. These tasks communicate with each other as needed to share control and data information throughout the gateway. A task is a software process that performs a specific function related to system control or session processing. Three types of tasks operate within the gateway in some embodiments: critical tasks, controller tasks, and manager tasks. The critical tasks control functions that relate to the gateway's ability to process calls such as gateway initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a gateway include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the gateway by monitoring the various software and hardware components of the gateway. Recovery control task subsystem is responsible for executing a recovery action for failures that occur in the gateway and receives recovery actions from the high availability task subsystem. Shared configuration task subsystem provides the gateway with an ability to set, retrieve, and receive notification of gateway configuration parameter changes and is responsible for storing configuration data for the applications running within the gateway. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the gateway, which include creating separate VPN contexts, starting IP services within a VPN context, managing IP pools and subscriber IP addresses, and distributing the IP flow information within a VPN context. In some embodiments, within the gateway, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

In some embodiments, the software needed for implementing a process or a database includes a high level procedural or an object-orientated language such as C, C++, C#, Java, or Perl. The software may also be implemented in assembly language if desired. Packet processing implemented in a gateway can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow. Other embodiments are within the following claims. For example, an LTE functionality such as a PDN gateway can be combined or co-located with the ASN gateway.

We claim:

1. A method of relocating co-located mobility anchor and anchor authenticator functionalities to a first access service network gateway (ASNGW) that is performing as a serving gateway from a second ASNGW that is serving as an anchor gateway in a communication network that includes mobile subscribers, the method comprising:
   receiving, at the first ASNGW, a relocation request from the second ASNGW including a dynamic host configuration protocol (DHCP) context and an authorization context associated with a mobile subscriber being relocated in an access service network (ASN);
   adding a dynamic host configuration protocol (DHCP) context to the first ASNGW to provide mobility anchor functionality for the mobile subscriber at the first ASNGW;
   sending, from the first ASNGW, a context report to update a WiMAX base station associated with the mobile subscriber that the first ASNGW is providing an anchor data path function (DPF) for the mobile subscriber;
   re-authenticating the mobile subscriber, at the first ASNGW, with the authorization context information received in the relocation request, wherein the re-authenticating includes sending an extensible authentication protocol (EAP) message and establishing a master session key (MSK) on the first ASNGW;
   adding an accounting context at the first ASNGW received from the second ASNGW; and
   establishing the first ASNGW as an anchor authenticator associated with the mobile subscriber.

2. The method of claim 1, further comprising:
   adding a foreign agent (FA) context to the first ASNGW;
   sending a mobile IP (MIP) registration request to a home agent from the first ASNGW to update the home agent with a new address for the FA context; and
   re-anchoring a MIP tunnel at the first ASNGW.

3. The method of claim 1, further comprising reducing signaling and latency in the relocation by sending both the DHCP context and the authenticator context at the same time to the first ASNGW.

4. A method of relocating anchor functionality to a first gateway that is performing as a serving gateway from a second gateway that is serving as an anchor gateway in a communication network that includes mobile subscribers, the method comprising:
   receiving, at the first gateway, a relocation request from the second gateway including a dynamic host configuration protocol (DHCP) context and an authorization context associated with a mobile subscriber being relocated in an access service network (ASN);
   adding a dynamic host configuration protocol (DHCP) context to the first gateway to provide mobility anchor functionality for the mobile subscriber at the first gateway;
   sending, from the first gateway, a context report to update a WiMAX base station associated with the mobile subscriber that the first gateway is providing the mobility anchor functionality;
   re-authenticating the mobile subscriber, at the first gateway, with the authorization context information received in the relocation request, wherein the re-authenticating includes sending an extensible authentication protocol (EAP) message and establishing a master session key (MSK) on the first gateway; and
   adding an accounting context at the first gateway received from the second gateway.

5. The method of claim 4 further comprising transitioning at the first gateway to an anchor data path function (DPF) after adding the DHCP context to the first gateway.

6. The method of claim 4, further comprising:
   adding a foreign agent (FA) context to the first gateway; and
   sending a mobile IP (MIP) registration request to a home agent from the first gateway to update the home agent with a new address for the FA context.

7. The method of claim 4, further comprising re-anchoring a MIP tunnel at the first gateway.

8. The method of claim 4, wherein the relocating anchor functionality from the second gateway to the first gateway includes relocating co-located functionalities of an authenticator, an anchor DPF, a foreign agent, and a proxy mobile IP (PMIP) client.

9. The method of claim 8, wherein the relocating anchor functionality from the second gateway to the first gateway includes relocating a prepaid client (PPC) functionality.

10. The method of claim 4, further comprising providing co-located authenticator, anchor DPF, and foreign agent functionalities for the mobile subscriber on the first gateway.

11. A gateway in an access service network (ASN) of a communication network that includes a WiMAX base station for communicating with a mobile subscriber, the gateway comprising: co-located functionalities of an authenticator functionality for authenticating the mobile subscriber and a mobility functionality for managing the mobility of the mobile subscriber in the communication network,
   wherein the gateway is configured to add the co-located functionalities after receiving a relocation message including a mobility context including a dynamic host configuration protocol (DHCP) context and an authorization context associated with the mobile subscriber being relocated in an access service network (ASN) to provide mobility anchor functionality for the mobile subscriber at the gateway, wherein the gateway is configured to update the WiMAX base station with mobility anchor functionality information for the mobile subscriber and to re-authenticate the mobile subscriber at the gateway using the mobility context and the authorization context received in the relocation message by sending an extensible authentication protocol (EAP) message and establishing a master session key (MSK) on the gateway, and wherein the gateway is configured to add an accounting context received at the gateway.

12. The gateway of claim 11, further comprising a proxy mobile IP (PMIP) client associated with the mobile subscriber and wherein the gateway anchors a MIP tunnel for the mobile subscriber.

13. The gateway of claim 11, wherein the gateway transitions to an anchor data path function (DPF) for the mobile subscriber after adding the co-located functionalities.

14. The gateway of claim 11, further comprising a prepaid client (PPC) functionality associated with the mobile subscriber for managing prepaid accounting for the mobile subscriber.

* * * * *